(12) United States Patent
Shimizu et al.

(10) Patent No.: US 11,368,068 B2
(45) Date of Patent: Jun. 21, 2022

(54) BEARING PRESSURE PLATE AND ROTATING ELECTRIC MACHINE USING SAME

(71) Applicant: MEIDENSHA CORPORATION, Tokyo (JP)

(72) Inventors: Akihumi Shimizu, Fuefuki (JP); Koji Nagata, Numazu (JP); Takashi Abe, Tokyo (JP); Yoshiharu Naito, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/310,256

(22) PCT Filed: Oct. 8, 2019

(86) PCT No.: PCT/JP2019/039561
§ 371 (c)(1),
(2) Date: Jul. 27, 2021

(87) PCT Pub. No.: WO2020/158052
PCT Pub. Date: Aug. 6, 2020

(65) Prior Publication Data
US 2022/0085684 A1    Mar. 17, 2022

(30) Foreign Application Priority Data
Jan. 28, 2019 (JP) .............................. JP2019-012388

(51) Int. Cl.
*H02K 5/24* (2006.01)
*H02K 5/173* (2006.01)
(Continued)

(52) U.S. Cl.
CPC ........... *H02K 5/1732* (2013.01); *F16C 27/00* (2013.01); *F16C 35/077* (2013.01); *H02K 5/15* (2013.01); *H02K 5/24* (2013.01)

(58) Field of Classification Search
CPC .......... H02K 5/1732; H02K 5/15; H02K 5/24; F16C 27/00; F16C 35/077
(Continued)

(56) References Cited

U.S. PATENT DOCUMENTS 9,182,006 B2    11/2015    Oshie et al.
2017/0204911 A1    7/2017    Ishibashi

FOREIGN PATENT DOCUMENTS

CN    1219223 A    6/1999
CN    103671675 A    3/2014
(Continued)

OTHER PUBLICATIONS

Chinese Office Action, Application No. 201980090382.2, dated Dec. 2, 2021, 6 pages.

*Primary Examiner* — Terrance L Kenerly
(74) *Attorney, Agent, or Firm* — Foley & Lardner LLP

(57) ABSTRACT

The present invention provides a bearing pressure plate and a dynamo-electric machine using the bearing pressure plate which are capable of avoiding breakage of a bolt by dispersing a stress when a load due to vibrations etc. is applied. A bearing pressure plate 5 has an annular inner ring portion 11 abutting against an outer ring 3Ba of a rolling bearing 3 that supports a rotation shaft 4, an annular outer ring portion 12 located at a radial direction outer side of the inner ring portion 11 and having a plurality of bolt holes 12b through which the outer ring portion 12 is secured to a fixing portion side with a plurality of bolts 12a, and bridge portions 13
(Continued)

integrally connecting the inner ring portion 11 and the outer ring portion 12 at positions except the bolt holes 12b in a circumferential direction.

<p align="center">5 Claims, 4 Drawing Sheets</p>

(51) Int. Cl.
    *H02K 5/15*     (2006.01)
    *F16C 27/00*     (2006.01)
    *F16C 35/077*     (2006.01)

(58) Field of Classification Search
    USPC .......................................................... 310/90
    See application file for complete search history.

(56) References Cited

FOREIGN PATENT DOCUMENTS

| | | | |
|---|---|---|---|
| CN | 106460938 | A | 2/2017 |
| CN | 109072981 | A | 12/2018 |
| JP | 2-202332 | A | 8/1990 |
| JP | 10-220553 | A | 8/1998 |
| JP | 2004-232774 | A | 8/2004 |
| JP | 2012-189195 | A | 10/2012 |
| JP | 2016-53413 | A | 4/2016 |
| JP | 2017-180649 | A | 10/2017 |
| JP | 2018-200077 | A | 12/2018 |

BEARING PRESSURE PLATE AND ROTATING ELECTRIC MACHINE USING SAME

TECHNICAL FIELD

The present invention relates to a bearing pressure plate and a rotating electric machine (a dynamo-electric machine) using the bearing pressure plate.

BACKGROUND ART

For instance, as disclosed in Patent Document 1, a conventional rotating electric machine (a conventional dynamo-electric machine) has a load-side bearing that is set at a bearing holding portion (a bearing accommodating portion) of a housing and supports a rotation shaft and an annular bearing pressure plate that is fixed to the housing so as to abut against or touch the load-side bearing from an anti-load side. This bearing pressure plate is a plate to prevent the load-side bearing from falling off from the bearing holding portion.

CITATION LIST

Patent Document

Patent Document 1: Japanese Unexamined Patent Application Publication No. 2004-232774

SUMMARY OF THE INVENTION

Technical Problem

The above bearing pressure plate is fixed to the housing by fastening with a bolt (s). When a load due to vibrations etc. is applied to such conventional dynamo-electric machine, a stress concentrates at a bolt hole (5) of the bearing pressure plate, then consequently there is a risk that the bolt inserted into the bolt hole will be broken.

The present invention was made in view of the above technical problem. An object of the present invention is therefore to provide a bearing pressure plate and a dynamo-electric machine using the bearing pressure plate which are capable of avoiding the breakage of the bolt by dispersing the stress when the load due to vibrations etc. is applied.

Solution to Problem

A bearing pressure plate according to a first invention to solve the above problem comprises: an annular inner ring portion abutting against an outer ring of a rolling bearing that supports a rotation shaft; an annular outer ring portion located at a radial direction outer side of the inner ring portion and having a plurality of bolt holes through which the outer ring portion is secured to a fixing portion side with a plurality of bolts; and bridge portions integrally connecting the inner ring portion and the outer ring portion at positions except the bolt holes in a circumferential direction.

As a bearing pressure plate according to a second invention to solve the above problem, on the bearing pressure plate according to the first invention, each of the bridge portions is connected in a curved manner to the inner ring portion and the outer ring portion.

As a bearing pressure plate according to a third invention to solve the above problem, on the bearing pressure plate according to the first or second invention, each of the bridge portions is formed at a middle position between adjacent two bolt holes in the circumferential direction.

As a bearing pressure plate according to a fourth invention to solve the above problem, on the bearing pressure plate according to one of the first to third inventions, the plurality of bolt holes are formed at regular intervals in the circumferential direction.

As a bearing pressure plate according to a fifth invention to solve the above problem, on the bearing pressure plate according to one of the first to fourth inventions, a plurality of widening portions that are widened toward a radial direction inner side are formed on the outer ring portion, and the plurality of bolt holes are provided at the widening portions respectively.

As a bearing pressure plate according to a sixth invention to solve the above problem, on the bearing pressure plate according to one of the first to fifth inventions, a radius of curvature of a connecting portion between each bridge portion and the outer ring portion is larger than that of a connecting portion between each bridge portion and the inner ring portion.

As a dynamo-electric machine according to a seventh invention to solve the above problem, the outer ring of the rolling bearing that is set at a housing and supports the rotation shaft by an inner ring of the rolling bearing is fixed to the housing with the outer ring being pressed against the housing by the bearing pressure plate according to one of the first to sixth inventions.

Effects of Invention

According to the bearing pressure plate and the dynamo-electric machine, the stress exerted on the bearing pressure plate when the load due to vibrations etc. is applied to the dynamo-electric machine is dispersed, then the breakage of the bolt for fastening the bearing pressure plate to a housing cover can be prevented.

EMBODIMENTS FOR CARRYING OUT THE INVENTION

An embodiment of a bearing pressure plate and a dynamo-electric machine according to the present invention will be described below with reference to the drawings.

Embodiment

Figure 1:
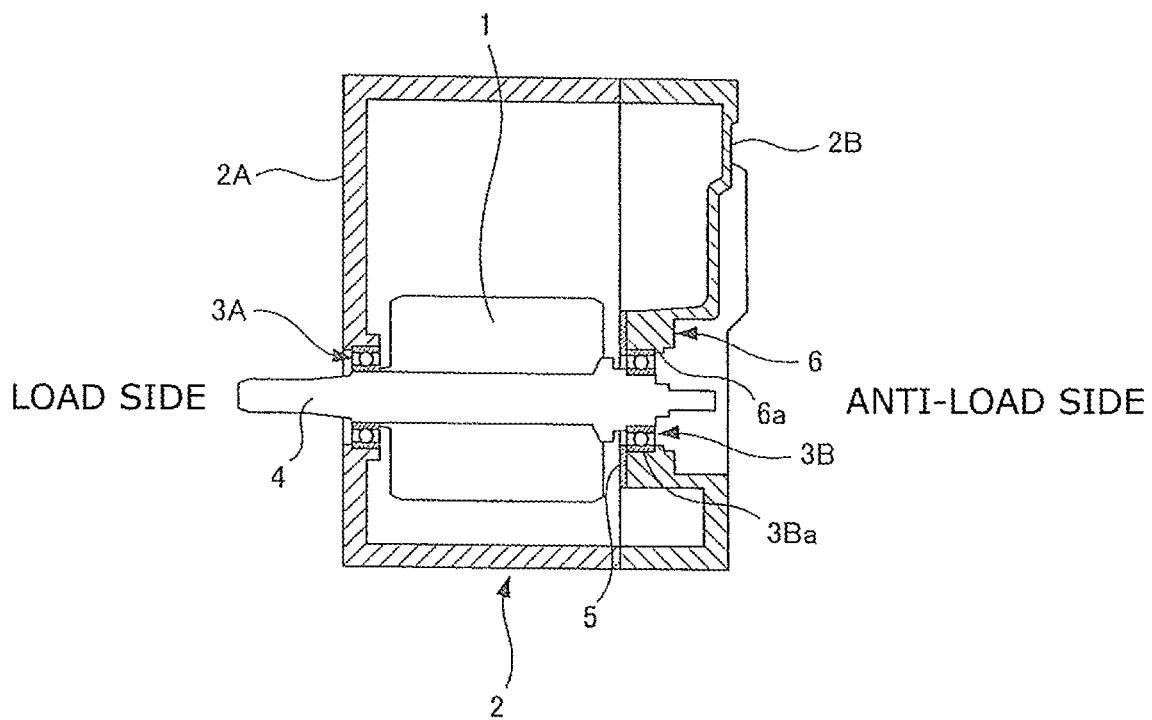
FIG. 1 is a schematic sectional view of a dynamo-electric machine according to an embodiment of the present invention.

First, a structure of a dynamo-electric machine according to the present embodiment will be described with reference to FIG. 1. As shown in a schematic sectional view of FIG. 1, the dynamo-electric machine according to the present embodiment has, as a basic structure, a housing (a fixing portion side) 2 accommodating therein a rotor 1 and a stator (not shown) located at an outer periphery of the rotor 1, bearings 3A and 3B provided at the housing 2, a rotation shaft 4 rotatably supported by the housing 2 through the bearings 3A and 3B and a bearing pressure plate 5 fixed to an anti-load side of the housing 2 by fastening with bolts.

The housing 2 is formed from a housing body 2A that is placed at a load side (at one end side in an axial direction) and a housing cover 2B that is attached to the housing body 2A from the anti-load side.

The load-side bearing 3A supporting a load side of the rotation shaft 4 is fixed to the housing body 2A. The anti-load-side bearing 3B supporting an anti-load side of the rotation shaft 4 is fixed to the housing cover 2B.

The housing cover 2B has a bearing holding portion 6 that holds or accommodates therein the anti-load-side bearing 3B. An inner peripheral surface of the bearing holding portion 6 is fitted to an outer peripheral surface of the anti-load-side bearing 3B. An annular flange 6a that protrudes toward a radial direction inner side is formed at an anti-load-side end portion of the inner peripheral surface of the bearing holding portion 6. A load side of the bearing holding portion 6 is open.

The anti-load-side bearing 3B is a rolling bearing that is accommodated in the bearing holding portion 6 so as to abut against or touch the flange 6a from the load side (with the load side of the bearing holding portion 6 open) and rotatably supports the anti-load side of the rotation shaft 4.

Figure 2:
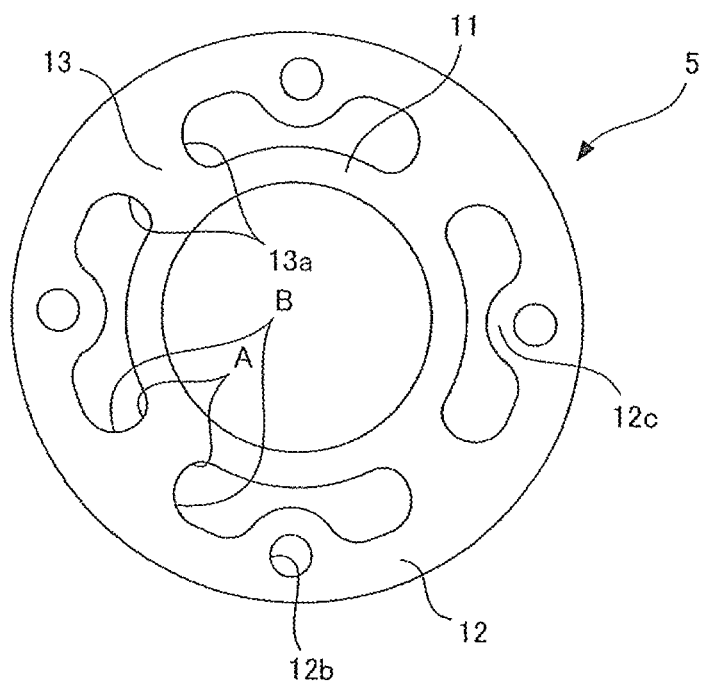
FIG. 2 is a front view of a bearing pressure plate according to the embodiment of the present invention.
Figure 3:
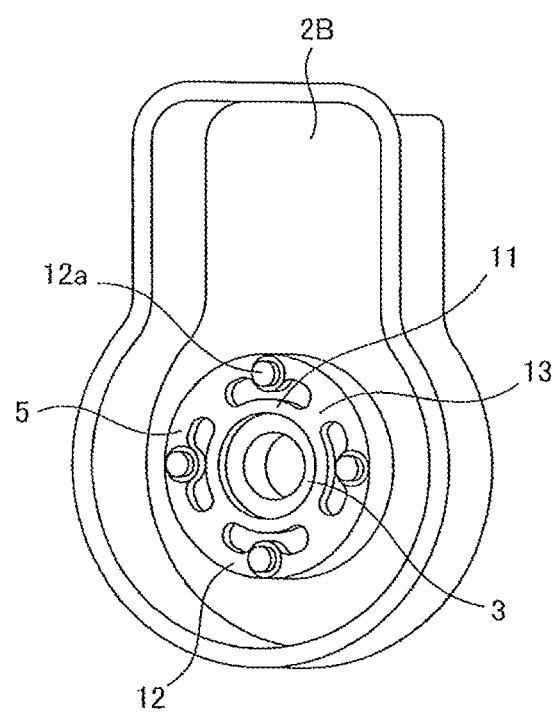
FIG. 3 is a perspective view showing a bearing, the bearing pressure plate and a housing cover according to the embodiment of the present invention.

Next, a structure of the bearing pressure plate 5 will be described in detail with reference to FIGS. 2 and 3. The bearing pressure plate 5 has an annular inner ring portion 11, an annular outer ring portion 12 located at a radial direction outer side with respect to the inner ring portion 11 and four bridge portions 13 connecting the inner ring portion 11 and the outer ring portion 12.

The inner ring portion 11 has an inside diameter that is greater than an inside diameter of the anti-load-side bearing 3B and smaller than an outside diameter of the anti-load-side bearing 3B. An outside diameter of the inner ring portion 11 is greater than the outside diameter of the anti-load-side bearing 33. Then, the inner ring portion 11 is set so as to abut against or touch an outer ring 3Ba of the anti-load-side bearing 3B from the load side.

As for the outer ring portion 12, four bolt holes 12b through which the outer ring portion 12 is secured to the housing cover 2B from the load side with bolts 12a (in FIG. 3, flange bolts) are formed at regular intervals in a circumferential direction on the outer ring portion 12.

Further, four widening portions 12c widened toward a radial direction inner side are formed on the outer ring portion 12. The four bolt holes 12b are provided at these four widening portions 12c respectively. Here, each widening portion 12c is formed into a shape that corresponds to a shape of a head of the bolt 12a.

The bridge portions 13 are formed so as to extend in the radial direction so that the inner ring portion 11 and the outer ring portion 12 are integrally joined at positions except the bolt holes 12b in the circumferential direction, preferably at respective middle positions between adjacent two bolt holes 12b in the circumferential direction.

Further, surfaces 13a facing in the circumferential direction, of each bridge portion 13, are curved so that the bridge portion 13 expands from a radial direction middle toward radial direction both ends of the bridge portion 13. With this, the bridge portion 13 is connected in a curved manner to the inner ring portion 11 and the outer ring portion 12 in plan view (connecting portions A and B in FIG. 2).

The bearing pressure plate 5 has the above structure, then the inner ring portion 11 is apart that receives a load, and the outer ring portion 12 is a part that is secured to the housing cover 2B with bolts.

In the dynamo-electric machine having the above structure according to the present embodiment, when a load (of the rotor 1 and the rotation shaft 4) due to vibrations etc. is applied, the bearing pressure plate 5 presses the anti-load-side bearing 3B (especially, the outer ring 3Ba) from the load side. It is therefore possible to prevent the anti-load-side bearing 3B from falling off from the bearing holding portion 6 to the load side. Here, since the flange 6a is located at an anti-load-side end portion of the anti-load-side bearing 3B, the anti-load-side bearing 3B does not fall off to an anti-load side of the bearing holding portion 6.

Figure 4:
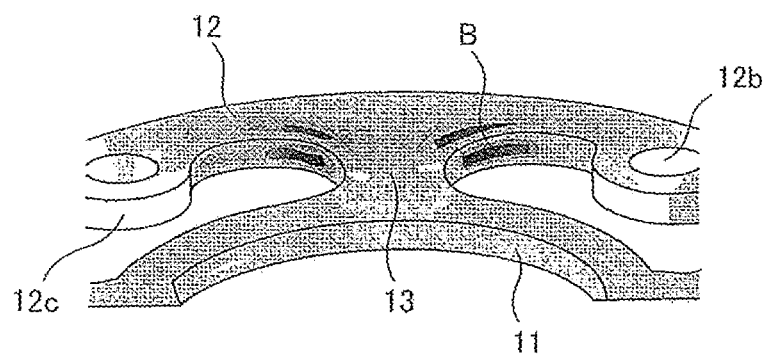
FIG. 4 is a local enlarged view of the bearing pressure plate where stress distribution is shown by simulation.

Further, the above load is transmitted to the housing cover 2B through the bearing pressure plate 5. In a case of the conventional bearing pressure plate as disclosed in Patent Document 1, at this time, a stress exerted on the bearing pressure plate concentrates at the bolt hole (s). As a consequence, there is a risk that the bolt (s) will be broken. In contrast to this, in the present embodiment, since the above load is transmitted to the bolt holes 12b of the outer ring portion 12 from the inner ring portion 11 through the bridge portions 13 on the bearing pressure plate 5, the stress concentrates at the connecting portions B between the bridge portions 13 and the outer ring portion 12, then the stress exerted on the bolt holes 12b is relieved (reduced). FIG. 4 is a local enlarged view of the bearing pressure plate 5 where distribution of the stress exerted on the bearing pressure plate 5 is shown in gray scale (the darker the gray color is, the higher the stress is). This figure indicates that a higher stress is applied to the connecting portions B as compared with the bolt holes 12b.

Furthermore, in the present embodiment, the bridge portion 13 is connected in a curved manner to the inner ring portion 11 and the outer ring portion 12 in plan view. It is therefore possible to prevent the stress from concentrating at one point of the connecting portion (as compared with a structure in which the bridge portion 13 is orthogonal to the inner ring portion 11 and the outer ring portion 12).

The bolt hole 12b is not formed on a circumference of the outer ring portion 12 as a perfect circle, but is formed at the widening portion 12c provided on the outer ring portion 12. Therefore, a width in the radial direction of the outer ring portion 12 can be small, thereby saving space.

Moreover, in the present embodiment, the bridge portion 13 is formed so that a radius of curvature of the connecting portion B between the bridge portion 13 and the outer ring portion 12 is larger than that of the connecting portion A between the bridge portion 13 and the inner ring portion 11. If the radius of curvature of the connecting portion B is the same radius of curvature of the connecting portion A, the stress on the connecting portion B when the load is applied becomes high. Therefore, in order to relieve (reduce) this stress, the radius of curvature of the connecting portion B is set to be larger.

Here, in the present embodiment, although the four bolt holes 12b and the four bridge portions 13 are formed on the bearing pressure plate 5, the present invention is not limited to this. As long as the number of the bolt holes 12b and the number of the bridge portions 13 are each plural (two or more), these numbers can be any numbers.

Further, as described in the present embodiment, if bridge portion 13 is placed between the adjacent bolt holes 12b in the circumferential direction, even if the number of the bolt holes 12b and the number of the bridge portions 13 are not equal to each other, the present invention is established. However, it is preferable that the number of the bolt holes 12b and the number of the bridge portions 13 be equal to each other.

INDUSTRIAL APPLICABILITY

The present invention is favorable as the bearing pressure plate and the dynamo-electric machine using the bearing pressure plate.

EXPLANATION OF REFERENCE

1 . . . rotor, 2 . . . housing, 2A . . . housing body, 2B . . . housing cover, 3A . . . load-side bearing, 3B . . . anti-load-side bearing, 3Ba . . . outer ring, 4 . . . rotation shaft, 5 . . . bearing pressure plate, 6 . . . bearing holding portion, 6a . . . flange, 11 . . . inner ring portion, 12 . . . outer ring portion, 12a . . . bolt, 12b . . . bolt hole, 12c . . . widening portion, 13 . . . bridge portion, 13a . . . surface (surface facing in a circumferential direction, A . . . connecting portion (connecting portion between bridge portion 13 and inner ring portion 11), B . . . connecting portion (connecting portion between bridge portion 13 and outer ring portion 12)

The invention claimed is:

1. A bearing pressure plate comprising:
an annular inner ring portion abutting against an outer ring of a rolling bearing that supports a rotation shaft;
an annular outer ring portion located at a radial direction outer side of the inner ring portion and having a plurality of bolt holes through which the outer ring portion is secured to a fixing portion side with a plurality of bolts; and
bridge portions integrally connecting the inner ring portion and the outer ring portion at positions except the bolt holes in a circumferential direction,
wherein surfaces, facing in the circumferential direction, of each of the bridge portions are curved so that the bridge portion expands from a radial direction middle toward radial direction both ends of the bridge portion,
wherein each of the bridge portions is connected in a curved manner to the inner ring portion and the outer ring portion, and
wherein a radius of curvature of a connecting portion between the surfaces, facing in the circumferential direction, of the bridge portion and the outer ring portion is larger than that of a connecting portion between the surfaces, facing in the circumferential direction, of the bridge portion and the inner ring portion.

2. The bearing pressure plate as claimed in claim 1, wherein
each of the bridge portions is formed at a middle position between adjacent two bolt holes in the circumferential direction.

3. The bearing pressure plate as claimed in claim 1, wherein
the plurality of bolt holes are formed at regular intervals in the circumferential direction.

4. The bearing pressure plate as claimed in claim 1, wherein
a plurality of widening portions that are widened toward a radial direction inner side are formed on the outer ring portion, and
the plurality of bolt holes are provided at the widening portions respectively.

5. A dynamo-electric machine, wherein
the outer ring of the rolling bearing that is set at a housing and supports the rotation shaft by an inner ring of the rolling bearing is fixed to the housing with the outer ring being pressed against the housing by the bearing pressure plate as claimed in claim 1.

* * * * *